United States Patent [19]

McMillan

[11] Patent Number: 6,008,811
[45] Date of Patent: *Dec. 28, 1999

[54] DRAG AND DROP METAPHORS FOR NON-PROGRAMMABLE EMULATION ENVIRONMENTS

[75] Inventor: Mark Anthony McMillan, Raleigh, N.C.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/808,900

[22] Filed: Feb. 28, 1997

[51] Int. Cl.$^6$ ........................................ G06F 9/00
[52] U.S. Cl. ............................................. 345/348
[58] Field of Search ................... 345/352, 332, 345/333, 334, 339, 340, 343, 348, 349, 346

[56] References Cited

U.S. PATENT DOCUMENTS

| 4,899,136 | 2/1990 | Beard et al. ............................ 345/346 |
| 5,185,603 | 2/1993 | Medin ..................................... 340/814 |
| 5,428,734 | 6/1995 | Haynes et al. . |
| 5,491,784 | 2/1996 | Douglas et al. . |
| 5,550,969 | 8/1996 | Torres et al. ............................ 345/348 |
| 5,608,860 | 3/1997 | Fitzpatrick et al. .................... 345/352 |
| 5,634,095 | 5/1997 | Wang et al. ............................ 345/326 |
| 5,777,630 | 7/1998 | Aaker et al. ............................ 345/507 |
| 5,831,607 | 11/1998 | Brooks .................................. 345/333 |

FOREIGN PATENT DOCUMENTS

| 0493881 | 7/1992 | European Pat. Off. . |
| 0653742 | 5/1995 | European Pat. Off. . |

OTHER PUBLICATIONS

European Search Report.

*Primary Examiner*—John E. Breene
*Assistant Examiner*—Cao H. Nguyen
*Attorney, Agent, or Firm*—Myers Bigel Sibley & Sajovec; Jeanine S. Ray-Yarletts

[57] ABSTRACT

The present invention extends the concept of drag and drop metaphors, which are common in a workstation environment, to non-programmable terminals such as 3270 terminals. This allows the ease of use and convenience of a workstation environment to interact with a non-programmable terminal emulation session such that older technology interfaces can take advantage of the usability of a workstation.

4 Claims, 5 Drawing Sheets

FIG. 2

DRAG AND DROP METAPHORS FOR NON-PROGRAMMABLE EMULATION ENVIRONMENTS

BACKGROUND OF THE INVENTION

Graphical user interfaces, or GUIs, have provided an easy to use interface for computer users. It has allowed entry of information and interaction with the computer while reducing the keystrokes required and also reducing the need to remember long, and sometimes extremely complex, commands. GUIs have been implemented extensively on programmable workstations and incorporated into operating systems such as IBM's OS/2$^R$ or Microsoft's Windows$^R$. GUIs allow users to manipulate data and cause programs to be executed or actions to occur using a mouse or other pointing device. A typical metaphor implemented in a graphical user interface is the drag/drop metaphor. The drag and drop metaphor allows a user to point to a particular object on the screen using their pointing device, grab that object and carry it over to another object that can perform an action on that object. This prior art is demonstrated in FIG. 1.

FIG. 1 depicts a simple OS/2 desktop which includes a file (102) and a shredder icon (104). If the user wishes to delete the file from his system, rather than having to go to an OS/2 window and type 'delete fn.ft' where fn is the file name and ft is the file type, using a drag/drop GUI, the user can point to the file, click on the file, drag the file over to the shredder then release the file over the shredder. When the user releases the file over the shredder, it will be deleted from the system. Additionally, there are numerous other actions or activities which may be accomplished by the use of the desktop GUI. Some of these are copying files, executing programs, sending files, proofing files and embedding sections into documents.

While the GUI has been extremely helpful in the desktop environment, it has not been implemented in the Non-Programmable Terminal Environment (NPTE). In this environment, the workstation application emulates a fixed function terminal such as an IBM 3270, 5250 or a CEC VT100. A workstation running an NPTE application has no inherent knowledge or understanding of the host application or data; the workstation is only providing a virtual keyboard and alpha-numeric display screen for the host system. The workstation does not interact with the host except to provide basic keyboard and alpha-numeric display services.

The GUI drag/drop metaphor has not been implemented in NPTE applications prior to the present invention for several reasons. First, the objects of interest (host files, database records, etc.) reside on the remote host system and the workstation has no direct access to them. Second, the view of any host objects is restricted to the alpha-numeric display as presented by a host application. The workstation cannot directly query the status or nature of any host objects. Third, the host does not directly indicate the position of any objects in the display space. Host applications display information intended for manual user interaction with a keyboard. Recognition of the position and nature of host objects is difficult.

Consequently, a technique is needed that provides the ease of use of the GUI in the non-programmable terminal environment of emulators supporting legacy environment such as 3270 terminal emulators.

OBJECTS OF THE INVENTION

It is an object of the present invention to support the drag/drop metaphor of a graphical user interface in a non-programmable terminal or emulator environment.

It is a further object of the present invention to allow the objects supported by the drag/drop metaphor to be context sensitive in that only certain actions will be performed to certain types of objects.

It is a third object of the present invention to support a scripting language that will allow the drag/drop metaphor to have complex actions performed on the object being acted upon by the user.

SUMMARY OF THE INVENTION

The present invention allows the extension of the drag/drop metaphor into a non-programmable terminal environment. The present invention also allows the implementation of context sensitivity to the objects being drag/dropped such that the actions allowed to be taken on any given object at a particular time are dependent upon characteristics of that object at that time. An example of this is that you might not be able to delete a document that is open for writing.

An additional aspect of the present invention is that of supporting a scripting language that enhances the number of actions allowed to be taken against the objects. This allows a user to use familiar desktop operations such as dragging a file to a printer when performing common tasks. The present invention can be used to allow objects, when appearing in an emulation window, to be manipulated using the same drag/drop type methods as the desktop objects. Implementing these metaphors as context sensitive allows the system to recognize host object types subject to drag/drop as they appear in the emulation window. The scripting allows users to define the semantics of the drag/drop such that arbitrary host objects are supported and the semantics of the drag/drop are customized to the users environment or desires. For more information on possible screen recognition algorithms that might be used in the present invention, see IBM Technical Disclosure Bulletin entitled *Using a Pointer for Host Application* and published in Vol. 38 #5, p.369 in May 1995.

The present invention is applicable in any software terminal emulation for non-programmable terminals such as 3270, 5250, ASCII VT100. It is also applicable to any type of host object such as files, records, databases and other user defined objects.

BRIEF DESCRIPTION OF THE DRAWINGS

FIG. 2 depicts a sample NPTE screen.

DETAILED DESCRIPTION OF THE PREFERRED EMBODIMENT

Figure 1:
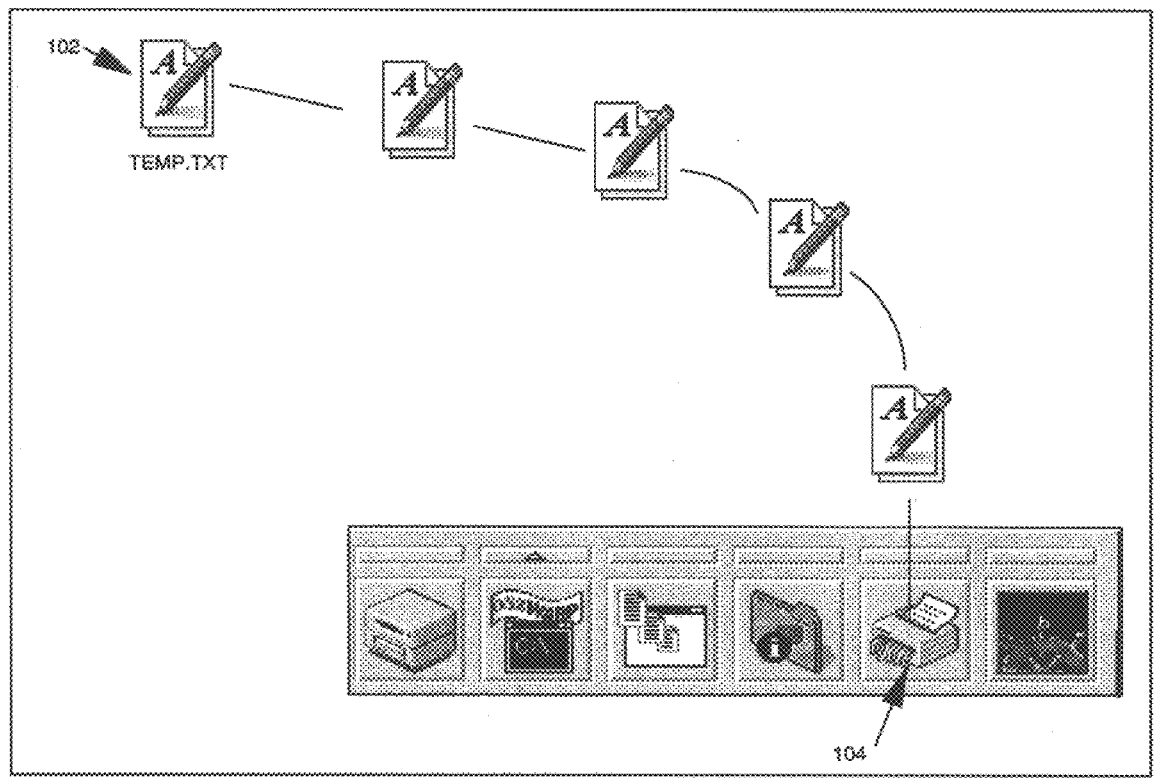
FIG. 1 is a sample of the existing desktop GUI. (Prior Art)

The preferred embodiment of the present invention was implemented on the OS/2 desktop using the CMMouse scripting language, although this invention is not limited to the present implementation and is applicable to any programmable desktop using any available language. The preferred embodiment of the present invention allows the user to define 'hot-spots' on the emulated screen. These emulated screens are defined and identified as host screens. The hot-spots on the host screen behave similarly to the hot-spots on the desktop such that the user can grab or drag an object from selected hot-spots on the emulator screen to selected locations on the desktop or to other locations within the emulator screen. These functions are also bidirectional in that scripts are also available for dragging objects from the desktop onto the emulator screen.

Figure 2:
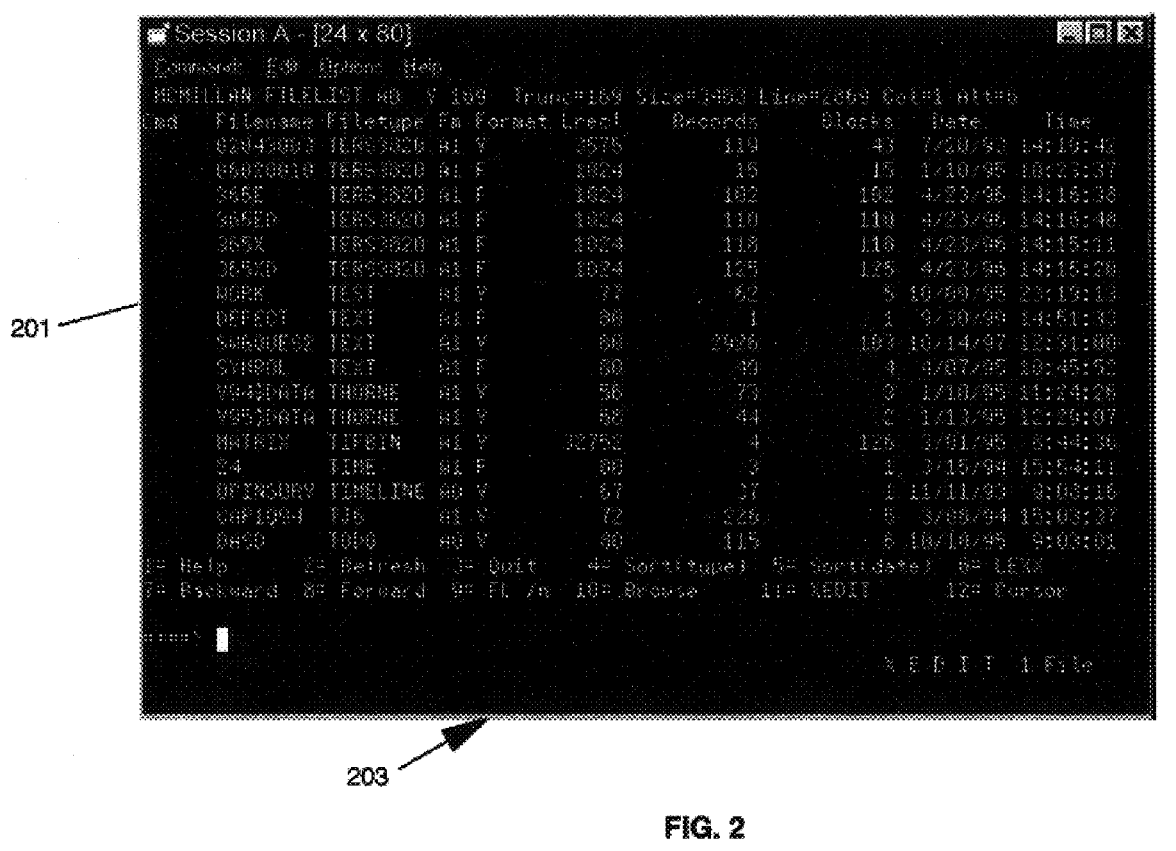

FIG. 2 shows a typical NPT emulator application running on a workstation desktop. The application displays the host alpha-numeric screen data (201) in a window (203). The host screen contains file names, file types, and other information relating to the files represented. Keystrokes entered on the workstation are sent to the host by way of the emulator application. The host application determines the layout, format, and content of the alpha-numeric screen. The NPT emulator has no inherent understanding of the host screen contents. This is typical of all NPT emulators in the industry.

The present invention creates contextual understanding of the host screen in such a way that drag/drop interaction with the workstation desktop is possible. It also supplies a method for the semantics of the drag/drop functions to be specified in a scripting language. This allows the user to define drag/drop semantics for any host object interacting with any workstation desktop object (for example, a host customer database record interacting with a workstation printer object to cause the customer profile to be printed).

In the preferred embodiment of the present invention, the user supplies a 'script' file to the application which contains three pieces of information. First, the file contains parameters for a screen recognition algorithm which allows the application to uniquely identify each host screen on which drag/drop will be supported. Recognition will be achieved by examining the alpha-numeric content of the NPT screen and comparing it to the strings supplied in the script file. A possible method of achieving this is described in IBM Technical Disclosure Bulletin entitled *Using a Pointer for Host Applications* published May 1995.

Next, for each screen specified above, the file contains entries representing the positions of objects which are candidates for 'drag' to the workstation desktop. For example, the file can describe where on the NPT screen the host application will show objects suitable for dragging to the desktop. For each object, the script specifies what type of object is to be found.

Next, for each position and object type specified above, a command list is given which will be executed when the object as described above is dropped on a suitable desktop object.

The following CMMouse script depicts the information identified above for a single host application.

```
*************************************************************
* Step 1: Define criteria for recognition of the host screen
*************************************************************
SCREEN 1 1 * "MCMILLAN FILELIST"
*************************************************************
* Step 2: Define area where objects (files) reside in the screen
*************************************************************
AREA 3 7 19 22
*************************************************************
* Define semantics for drop onto desktop of FILE objects and desktop
* PRINTER objects. The script implements the semantic.
*************************************************************
DRAG FILE "{xfer host='&{chars &{mrow} 7 20}'
    pc='*' type=vm quiet=y clear=n}
DRAG PRINT "{xfer host='&{chars &{mroW} 7 20}'
    pc='print.tmp' type=vm quiet=y clear=n}
    {if'{&var system__xrc}' ='0'
```

-continued

```
    {then} {print file='print.tmp' printer=drop delete=y}
    {else} {?Download for printing failed.}
}"
```

The above sample CMMouse script defines an area of the screen where the objects (in this case, file names) exist. Two drag/drop semantics are then defined for the files, the first defines what happens when the objects are dropped on a desktop FILE receiver (in this example the file is downloaded). The second defines what happens when the object is dropped on a PRINTER (in this example the file is downloaded, sent to the printer, and then deleted).

In the preferred embodiment of the present invention, when the application detects the start of a drag operation on the NPT emulator window, it does the following steps:

a. Determine the coordinate of where the drag started (Point "S") in the emulated host terminal space.

b. Run a screen recognition algorithm using the information from the above process. If the screen is not recognized, disallow the drag (e.g. the context of the host application does not allow a drag operation).

c. Determine if Point "S" is within the coordinates defined by the above mentioned process. If not, disallow the drag (e.g. there are no draggable objects at the point the user is attempting to begin a drag).

Figure 3:
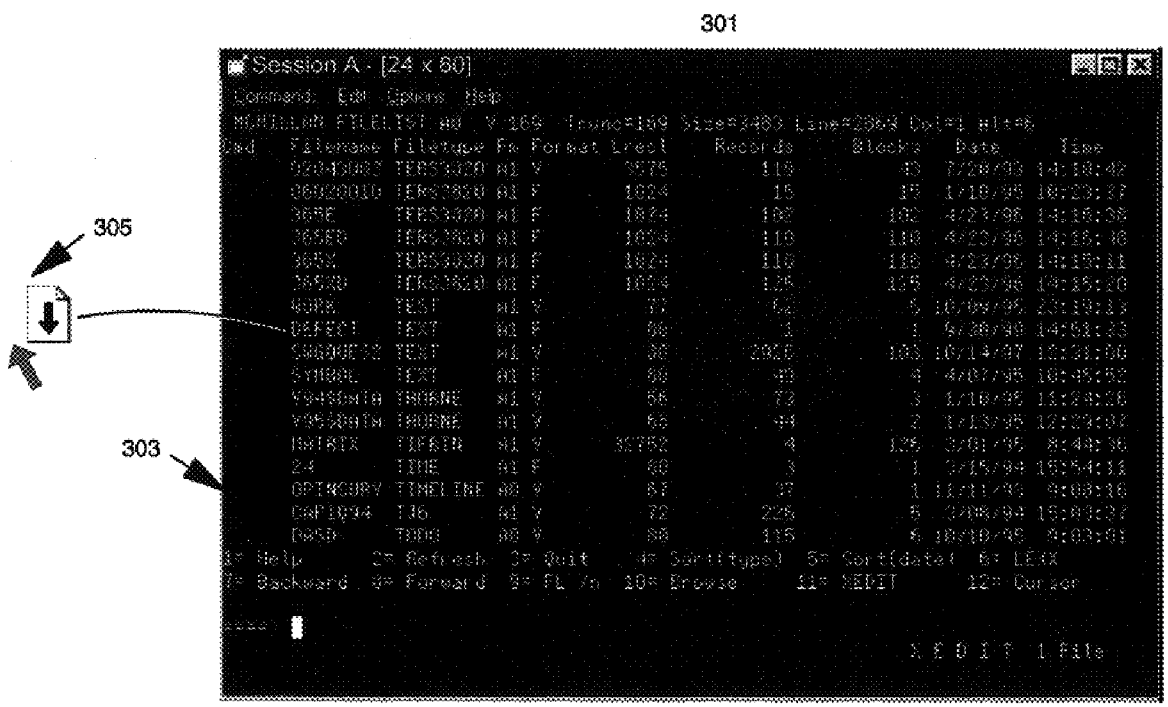
FIG. 3 depicts the use of a mouse and icon to select an object from the NPTE screen.

If the drag operation is allowed; first feedback may be provided to the user. One method of providing feedback is by changing the pointer shape to indicate a drag is in progress although other methods of feedback exist and the present invention is not limited to any particular means of feedback. FIG. 3 depicts a screen once a drag has been started in the NPT window (301) over a file name (303). The pointer (305) has been changed into a file object to indicate a drag is in progress.

As the pointer is moved over desktop objects, a check is made to determine if the object under the pointer matches one of the semantic types for which a script is defined. If there is no match then the user is not permitted to drop at that point. The preferred embodiment of the present invention provides feedback to the user by presenting a "do-not-drop" shape for the pointer. For example, if the scripts define FILE and PRINT semantics, drops are not allowed on any other object type (e.g. shredder, programs).

Figure 4:
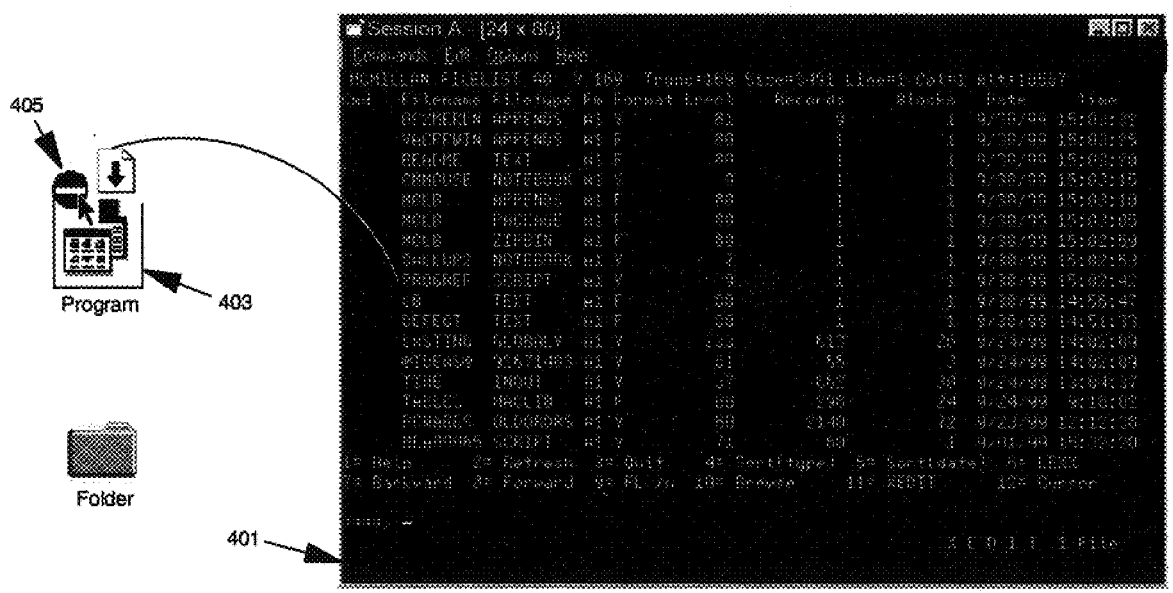
FIG. 4 demonstrates the notification to a user if an action is not permitted to be taken in the present environment.

FIG. 4 demonstrates a user having dragged a file object over a desktop program object. Because, in the present example, there is no semantic defined in the script for a drop on a desktop program object, the pointer is accented with a "do-no-enter" symbol and a drop is not allowed (the context is not valid).

Figure 5:
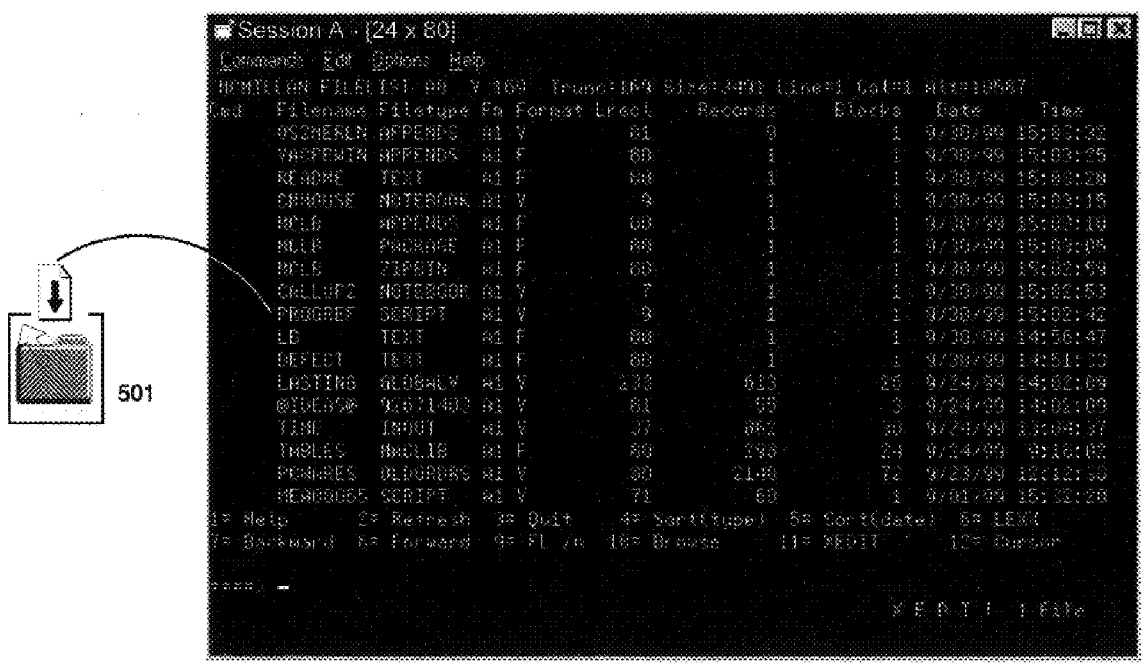
FIG. 5 depicts the feedback to the user when an object is copied from an NPTE screen to a workstation desktop.

Following the present example, if the user drops onto a desktop object that matches a script semantic type, then the associated script is executed. In the example above, if a drop is made on a desktop file container (folder) (501), the script following the DRAG FILE statement is run. The script will implement whatever actions the user wants to associate with the drop as shown in FIG. 5. FIG. 5 depicts the user having dragged over a desktop file container (folder) (501) and is free to drop the object there (the context is valid).

Thus, with the present invention, drag/drop from NPT emulator screens is possible with proper context understanding, and scripting of the resulting semantics.

FIG. 6 is a flow chart of the logic flow represented in the preferred embodiment. First the application obtains the handle of the NPT window using standard NPT programming interfaces (601). A call is then made from the application to the desktop operating system to request that all drag/drop events on the NPT window are to be sent to the application (603). This may require subclassing the NPT window or using other operating system APIs.

The application waits until the operating system instructs it that a drag operation has begun (605). The operating system, after receiving the request to notify the application of drag/drop requests (650), continues with other work while waiting until the user begins to drag the mouse pointer on the NPT window (652), at which time the operating system notifies the application that the user begins dragging the mouse pointer on the NPT window (654). When the application receives the notification that a drag has begun (607), the application translates the mouse coordinates supplied by the operating system to host row/column coordinates (609).

Next the application reads the current alpha-numeric contents of the NPT host screen using standard NPT programming interfaces such as EHLLAPI. The screen data obtained is compared to the screen description supplied in the script file (611) If there is no match, the operating system is instructed to terminate the drag operation (613) and the application waits for another drag to start (605). If the translated mouse coordinates (609) do not match the position of any objects specified in the script (615), then the operating system is instructed to terminate the drag operation (613) and the application waits for another drag to start (605). If the translated mouse coordinates do match the position of one of the objects specified in the script, then the application instructs the operating system to continue the drag/drop operation (617). The application receives the drag type from the script and uses the drag type as input to a query to the desktop object under the mouse pointer to determine if the desktop object will accept a drop of the present type (619). If the desktop object will not accept a drop of the given object type, the mouse pointer is set to a 'do-not-drop' symbol (621) and the operating system is instructed to continue the drop operation, but not to allow a drop at the current location.

The operating system notifies the application when a drop occurred. When the application receives the notification that the drop has occurred (623), the application reads the set of drop commands from the script and executes the commands (625). The application then returns to await another drop command (627).

What is claimed is:

1. In a computer workstation, a method for enabling the use of a computer pointing device to indicate a host object on a host non-programmable terminal (NPT) emulator session, select said NPT host object, and drag said host object to a local receiver object on the local workstation desktop, said method comprising the steps of:

programmably enabling a user to indicate said NPT host object from within said non-programmable terminal emulator session by directing said pointing device;

programmably dragging said NPT host object to one of a number of predetermined local desktop objects;

releasing said NPT host object over one of said local desktop objects;

determining a NPT host object type of the selected NPT host object from a predetermined set of NPT host object types;

determining a local desktop object type of the one of a number of predetermined local desktop objects from a predetermined set of local desktop object types;

scanning a script of said predetermined NPT host object types and said predetermined local desktop object types so as to define actions associated with the predetermined NPT host object types and the predetermined local desktop object types; and, performing the associated action on said NPT selected host object if the determined local desktop object type of the one of a number of predetermined local desktop objects has a defined action associated with the determined NPT host object type of the selected host object.

2. A method as claimed in claim 1 comprising the additional steps of:

presenting an indicator to a user if the one of a number of predetermined local desktop objects does not have a defined action associated with the determined NPT host object type of the selected NPT host object.

3. A computer workstation having a local desktop graphical user interface comprising:

means for enabling a non-programmable terminal (NPT) emulation session;

means for enabling a user to select an NPT item from within said non-programmable terminal emulation session;

means for dragging said selected NPT item from within said non-programmable terminal emulation session to said workstation local desktop;

means for determining a type of said NPT item from a predetermined list of NPT item types;

means for releasing said NPT item over a local desktop object;

means for determining actions associated with the local desktop object and the selected NPT item; and means, responsive to said means for determining actions, for carrying out the determined actions so as to allow said local desktop object to act on said NPT item.

4. A computer workstation as in claim 3 wherein said means for determining actions comprises:

means for accessing a script containing actions associated with said NPT item types and said local desktop objects; and, means for allowing the local desktop object to act on the selected NPT item only if said local desktop object has actions associated with the NPT item type of the selected NPT item.

* * * * *

UNITED STATES PATENT AND TRADEMARK OFFICE
CERTIFICATE OF CORRECTION

PATENT NO. : 6,008,811
DATED : December 28, 1999
INVENTOR(S) : Mark Anthony McMillan Page 1 of 1

It is certified that error appears in the above-identified patent and that said Letters Patent is hereby corrected as shown below:

Column 4,
Line 64, delete the sentence beginning "Figure 6...".
Line 67, delete "(601)".

Column 5,
Line 3, delete "(603)".
Line 6, delete "(605)".
Line 8, delete "(650)".
Line 10, delete "(652)".
Line 12, delete "(654)".
Line 13, delete "(607)".
Line 15, delete "(609)".
Line 20, delete "(611)".
Line 21, delete "(613)".
Line 22, delete "(605)".
Line 23, delete "(609)".
Line 24, delete "(615)".
Line 26, delete "(613))".
Line 27, delete "(605)".
Line 30, delete "(617)".
Line 34, delete "(619)".
Line 36, delete "(621)".
Line 41, delete "(623)".
Line 43, delete "(625)".
Line 44, delete "(627)".

Signed and Sealed this

Fifth Day of March, 2002

*Attest:*

*Attesting Officer*

JAMES E. ROGAN
*Director of the United States Patent and Trademark Office*